United States Patent
Tseng

(10) Patent No.: US 9,680,929 B2
(45) Date of Patent: *Jun. 13, 2017

(54) CONCURRENTLY UPLOADING MULTIMEDIA OBJECTS AND ASSOCIATING METADATA WITH THE MULTIMEDIA OBJECTS

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/168,076

(22) Filed: Jun. 24, 2011

(65) Prior Publication Data

US 2012/0331091 A1    Dec. 27, 2012

(51) Int. Cl.
H04L 29/08 (2006.01)
G06F 3/0482 (2013.01)
G06F 3/0484 (2013.01)
G06F 17/30 (2006.01)

(52) U.S. Cl.
CPC ........ *H04L 67/1097* (2013.01); *G06F 3/0482* (2013.01); *G06F 3/04842* (2013.01); *G06F 17/30017* (2013.01); *H04L 67/06* (2013.01)

(58) Field of Classification Search
CPC ............................... H04L 29/00; H04L 67/06
USPC ................................. 709/217, 203, 219, 210
See application file for complete search history.

(56) References Cited

U.S. PATENT DOCUMENTS

| | | | |
|---|---|---|---|
| 6,826,725 B1 * | 11/2004 | Beezer et al. | 715/209 |
| 7,225,400 B2 * | 5/2007 | Beezer et al. | 715/205 |
| 7,296,025 B2 * | 11/2007 | Kung et al. | 707/608 |
| 7,653,302 B2 * | 1/2010 | Limberis et al. | 396/310 |
| 7,761,536 B2 * | 7/2010 | Subramanian | G06Q 30/06 709/206 |
| 7,984,330 B2 * | 7/2011 | Nair et al. | 714/20 |
| 8,265,686 B2 * | 9/2012 | Klassen et al. | 455/550.1 |
| 8,327,253 B2 * | 12/2012 | Han | G11B 27/034 705/318 |
| 8,424,041 B2 * | 4/2013 | Candelore et al. | 725/50 |
| 2004/0225956 A1 * | 11/2004 | Beezer et al. | 715/500.1 |
| 2006/0007947 A1 * | 1/2006 | Li et al. | 370/432 |
| 2006/0039036 A1 * | 2/2006 | Tsuboi | H04N 1/00912 358/403 |
| 2006/0045473 A1 * | 3/2006 | Alterman | 386/69 |
| 2006/0184540 A1 * | 8/2006 | Kung et al. | 707/10 |

(Continued)

FOREIGN PATENT DOCUMENTS

| | | |
|---|---|---|
| CN | 101883141 A | 11/2010 |
| CN | 101884036 A | 11/2010 |

(Continued)

OTHER PUBLICATIONS

Home Page for Flickr, www.flickr.com, downloaded Jun. 24, 2011.

(Continued)

*Primary Examiner* — Jimmy H Tran
(74) *Attorney, Agent, or Firm* — Baker Botts L.L.P.

(57) ABSTRACT

In one embodiment, accessing a set of multimedia objects stored on a first computing device; initiating upload of the set of multimedia objects to a second computing device; and while the set of multimedia objects is being uploaded to the second computing device, receiving metadata entered by a user and associating metadata with each of one or more multimedia objects from the set of multimedia objects.

22 Claims, 3 Drawing Sheets

(56) References Cited

U.S. PATENT DOCUMENTS

| | | | |
|---|---|---|---|
| 2006/0221190 A1* | 10/2006 | Limberis et al. | 348/207.1 |
| 2007/0064124 A1* | 3/2007 | Kirani et al. | 348/234 |
| 2007/0088851 A1* | 4/2007 | Levkovitz et al. | 709/246 |
| 2007/0130291 A1* | 6/2007 | Subramanian | G06Q 30/06 709/219 |
| 2007/0216782 A1* | 9/2007 | Chernoff | 348/231.99 |
| 2008/0204317 A1* | 8/2008 | Schreve | G06F 17/30265 342/357.52 |
| 2008/0299997 A1* | 12/2008 | Klassen et al. | 455/466 |
| 2009/0100068 A1* | 4/2009 | Gauba | G06F 17/30274 |
| 2009/0100096 A1* | 4/2009 | Erlichson | H04L 67/02 |
| 2009/0144657 A1* | 6/2009 | Zhang et al. | 715/810 |
| 2010/0063961 A1 | 3/2010 | Guiheneuf | |
| 2010/0076976 A1 | 3/2010 | Sotirov | |
| 2010/0094703 A1* | 4/2010 | Bramley et al. | 705/14.45 |
| 2010/0130226 A1* | 5/2010 | Arrasvuori et al. | 455/456.1 |
| 2010/0223620 A1* | 9/2010 | Nair et al. | 718/104 |
| 2010/0287580 A1* | 11/2010 | Harding | G06Q 30/0247 725/14 |
| 2011/0060793 A1* | 3/2011 | Wheeler et al. | 709/203 |
| 2011/0288946 A1 | 11/2011 | Baiya | |
| 2012/0117473 A1* | 5/2012 | Han | G11B 27/034 715/723 |
| 2012/0179571 A1* | 7/2012 | Grosso, III | G06Q 30/0621 705/26.5 |
| 2012/0252353 A1* | 10/2012 | Cok et al. | 455/3.06 |
| 2012/0278387 A1* | 11/2012 | Garcia et al. | 709/204 |
| 2013/0014025 A1* | 1/2013 | Nagata et al. | 715/752 |
| 2013/0185747 A1* | 7/2013 | Candelore et al. | 725/28 |
| 2014/0081933 A1* | 3/2014 | Uhrhane et al. | 707/695 |
| 2014/0244859 A1* | 8/2014 | Jannink et al. | 709/231 |
| 2014/0373075 A1* | 12/2014 | Candelore et al. | 725/61 |

FOREIGN PATENT DOCUMENTS

| | | |
|---|---|---|
| EP | 2120160 | 11/2009 |
| EP | 2296360 B1 | 1/2013 |
| JP | 2006-060323 A | 3/2006 |
| JP | 2007-334696 | 12/2007 |
| JP | 2009-284446 | 12/2009 |
| JP | 2010-187217 | 8/2010 |
| KR | 2011-0040858 | 4/2011 |

OTHER PUBLICATIONS

U.S. Appl. No. 12/890,283, filed Sep. 24, 2010, Tseng.
*Sharing, Discovering and Browsing Geotagged Pictures on the Web*, Digital Media Systems Laboratory, HP Laboratories Bristol, Carlo Torniai, Steve Battle, Steve Cayzer, 19 pgs., May 15, 2007.
*Assessment of metadata associated with geotag pictures*, Master Thesis, Institute for Geoinformatics University of Muenster, Anand Nandipatim, 47 pgs., Feb. 7, 2011.
International Search Report and Written Opinion for International Application PCT/US2012/040973, Feb. 20, 2013.
EP Communication and Supplementary European Search Report from European Patent Office for EP Patent Application No. 12803399.0 Oct. 6, 2014.
CA Office Action with Examination Search Report from Canadian Intellectual Property Office for CA Patent Application No. 2,839,252 Jun. 22, 2015.
MX Office Action from Mexican Institute of Industrial Property (IMPI) for MX Patent Application No. MX/a/2013/015013 (with English translation) Mar. 6, 2015.
JP Office Action Notification of Reason for Rejection for JP Patent Application No. 2014-516991 from Japan Patent Office (with English translation) Aug. 11, 2015.
Notice of Preliminary Rejection for KR Application No. 10-2014-7001383 from Korean Intellectual Property Office with English translation Oct. 7, 2015.
Canadian Application (PPH) has been examined by the Canadian IP Office for Canadian Appln. No. 2,839,252. Jan. 29, 2016.
Notification of the First Office Action for CN Patent Application No. 2012800310505 from The State Intellectual Property Office of the People's Republic of China (with English translation). Sep. 29, 2015.
Canadian Office Action received from the Canadian Intellectual Property Office for Canadian Patent Application No. 2,839,252. May 27, 2016.
Chinese Office Action received for Chinese Patent Application No. 2016053100011760. Jun. 3, 2016.
Japanese Office Action (Notification of Reason for Rejection) dated Mar. 22, 2016 for Japanese Application No. 2014-516991. Mar. 22, 2016.
Chinese Office Action received for Chinese Patent Application No. 2012800310505. Nov. 30, 2016.

* cited by examiner

CONCURRENTLY UPLOADING MULTIMEDIA OBJECTS AND ASSOCIATING METADATA WITH THE MULTIMEDIA OBJECTS

TECHNICAL FIELD

This disclosure generally relates to transmitting multimedia objects and metadata associated with the multimedia objects between computing devices, such as clients and servers.

BACKGROUND

Cloud storage is a model of networked online storage where data are stored on multiple virtual servers, generally hosted by third parties. There are several advantages with cloud storage. For example, by storing data on remote servers instead of on one's own user devices (i.e., clients), the storage space on the user devices may be freed up for other uses. At the same time, the data may be professionally managed by the third parties (e.g., organize, backup, secure, etc.) and easily shared with other people.

Online storage has become popular in recent years as the amount of digital data grows rapidly. In one instance, many social-networking websites provide various forms of online storage to their users in order to support and encourage information sharing among the users. For example, FLICKR (www.flickr.com) is a web-based service that enables its users to upload and share digital images; and YOUTUBE (www.youtube.com) is another web-based service that enables its users to upload and share digital videos and audios.

SUMMARY

This disclosure generally relates to transmitting multimedia objects and metadata associated with the multimedia objects between computing devices, such as clients and servers. More specifically, in particular embodiments, while a set of multimedia objects (e.g., digital photographs) stored on a first device (e.g., a client) is being uploaded to a second device (e.g., a server), metadata are associated with at least some of the multimedia objects being uploaded. Subsequently, the metadata may also be uploaded to the second device.

In particular embodiments, accessing a set of multimedia objects stored on a first computing device; initiating upload of the set of multimedia objects to a second computing device; and while the set of multimedia objects is being uploaded to the second computing device, receiving metadata entered by a user of the first computing device and associating metadata with each of one or more multimedia objects from the set of multimedia objects.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

With online storage, a user may upload digital images or other multimedia objects, such as digital photographs, to a server managed by a third party for storage or for sharing with other users. A user may select a set of images stored on a user device (e.g., a client), and instruct the user device to establish a network connection with another device (e.g., a server) and upload the set of images to the other device. Often, there may be metadata (e.g., tags) associated with at least some of the images. For example, the metadata associated with a photograph may include, without limitation, the photograph's title or description, camera settings (e.g., exposure value, shutter speed, aperture, etc.), names of the people in the photograph, the date or time when the photograph is taken, the event during which the photograph is taken, the location (e.g., latitude and longitude, city, attraction, etc.) where the photograph is taken, or the album to which the photograph belong.

Given a set of one or more images, sometimes, it may take some time to transmit the image data from a user device to a server, especially when the amount of data is relatively large or the bandwidth of the network connection is relatively low. With some types of user devices (e.g., mobile devices such as mobile telephones), while the image data are being transmitted from the user device to the server, there may not be many other operations the user may perform with the user device, because the resources of the user device may be substantially consumed by the data transmission (e.g., the bandwidth of the network connection is substantially used up for transmitting the image data) or because the user device does not support concurrent executions of multiple applications (e.g., devices running Apple iOS applications).

Figure 1:
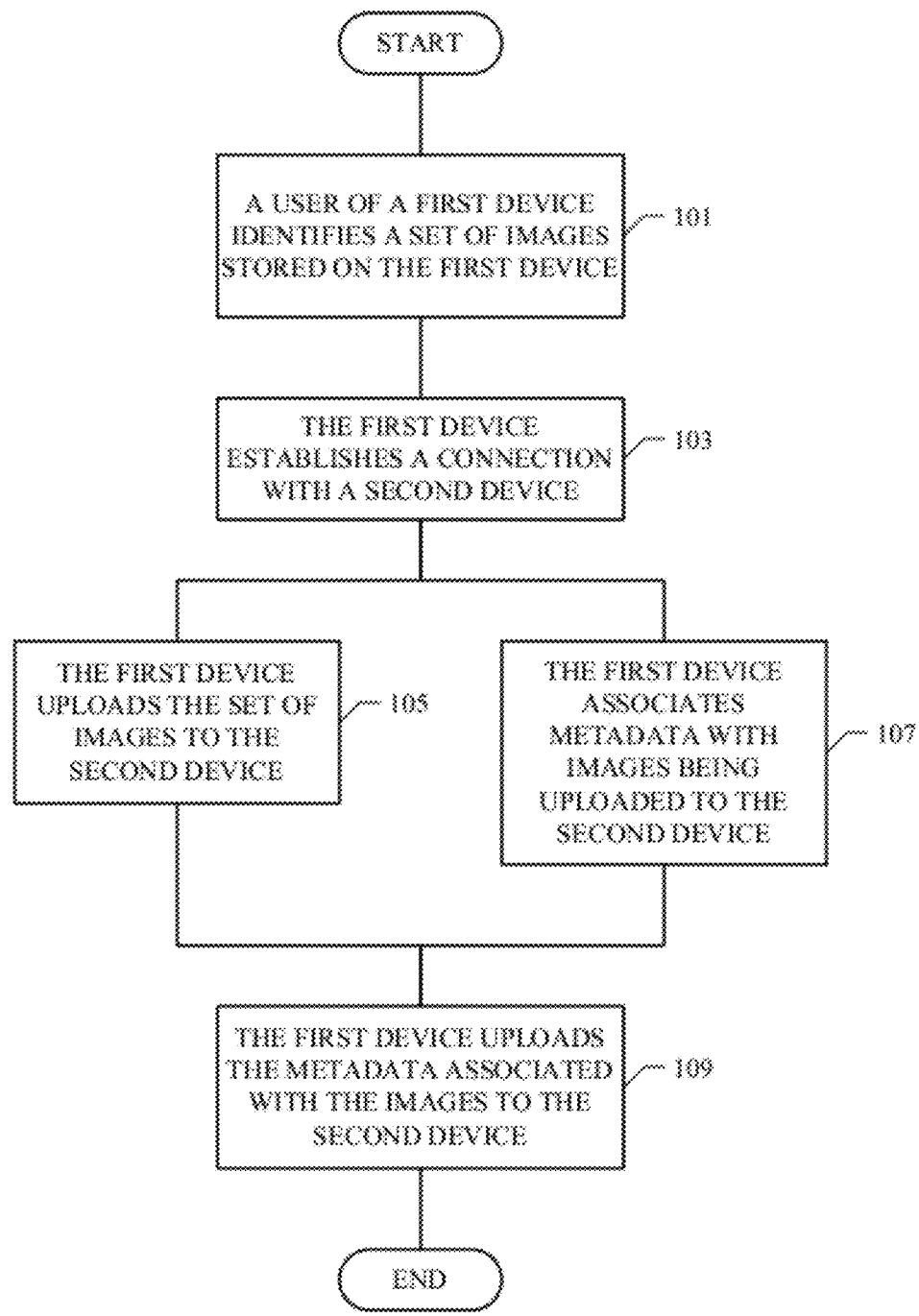
FIG. 1 illustrates an example method for concurrently uploading images and associating metadata with at least some of the images being uploaded.

In particular embodiments, while waiting for a set of images (e.g., photographs) being uploaded from a user device to a server, metadata are associated with at least some of the images being uploaded. Subsequently (e.g., after the upload of the image data has been completed), the metadata may also be uploaded to the server. FIG. 1 illustrates an example method for concurrently uploading images and associating metadata with at least some of the images being uploaded. The client-side processes described herein may be implemented as a JavaScript object embedded in a web page from which a user may opt to select one or more digital media files for upload.

In particular embodiments, there may be digital images (e.g., photographs) stored on a first device (e.g., a user device) associated with a user. The user may identify a set of images, from the images stored on the first device, for uploading to a second device (e.g., a server), as illustrated in STEP 101. Note that there may be any number of images in the set that are uploaded at one time.

When the user is done selecting the images for upload, the first device may establish a network connection (e.g., a TCP, FTP, or any other suitable connection) with the second device, as illustrated in STEP 103, and begin uploading the image data to the second device over the network connection, as illustrated in STEP 105.

In particular embodiments, while the image data are being uploaded from the first device to the second device, the first device may associate metadata with at least some of the images being uploaded, as illustrated in STEP 107. As one example, the user may select some images in the set, and provide metadata to each selected image via a user interface component. In some implementations, the user may scroll or swipe through a set of the images in the upload queue and select one for tagging with metadata. The user-provided metadata are then associated with the corresponding images. As another example, the first device may automatically determine metadata for some of the images in the set based on information stored on the first device, and associate the determined metadata with the corresponding images. For example, if the first device includes a digital camera (e.g., a mobile telephone with a built-in camera), the first device may be used to take digital photographs. The camera settings, date, time, or location information (e.g., obtained from a GPS sensor of the first device) may be associated with a photograph as its metadata. In addition, the first device may automatically associate appropriate user information with a photograph as its metadata. Automatically tagging users to an image is described in more detail in U.S. patent application Ser. No. 12/890,283, entitled "Auto Tagging in Geo-Social Networking System". filed on 24 Sep. 2010, which is hereby incorporated by reference in its entirety for all purposes. In one implementation, the user may be asked, during the upload process, to confirm the tags that have been automatically associated by the server.

After upload of the images or other digital media files, the first device may upload the metadata associated with the images to the second device, as illustrated in STEP 109. In particular embodiments, the first device may wait until all the image data corresponding to the set of images have been completely uploaded to the second device, and then upload the metadata associated with the images. Alternatively, in particular embodiments, the first device may alternate between uploading the image data and the metadata. In this case, the first device may concurrently upload a first image and associate metadata with the first image, upload the metadata of the first image; then, concurrently upload a second image and associate metadata with the second image, upload the metadata of the second image; and so on. In one implementation, the metadata is associated with a file name or other handler associated with a corresponding image file.

Although the steps illustrated in FIG. 1 are described in reference to images, the same concept may be applied to transmitting any type of data. For example, a set of files (e.g., text files, audio files, video files, as well as image files) may be uploaded from a first device to a second device. While uploading the file data, metadata may be associated with at least some of the files being uploaded. Subsequently (e.g., when the file data have been completely uploaded), the metadata associated with the files may also be uploaded to the second device.

Figure 2:
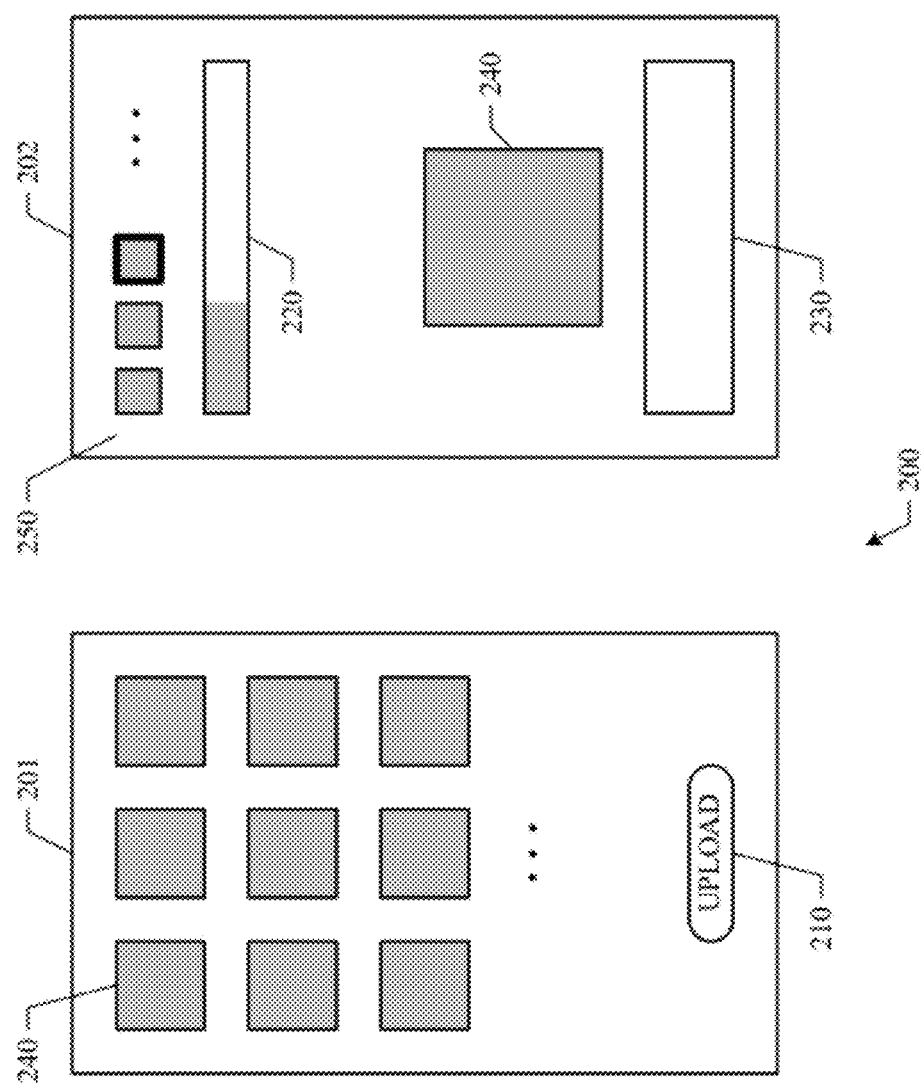
FIG. 2 illustrates an example user interface.

FIG. 2 illustrates an example user interface 200 that enables a user to upload images and associate metadata with individual images being uploaded. For didactic purposes, the described implementation operations in connection with captured images; however, the invention may be employed in connection with any suitable multimedia object, such as video, audio and the like. User interface 200 may include a number of screens. In particular embodiments, in a first screen 201, the user may select the specific images 240 to be uploaded. The selected images 240 may be presented to the user (e.g., as thumbnails) for review. When the user has confirmed images 240 to be uploaded, the user may click a "UPLOAD" button 210 to initiate the upload process. Screen 201 may then be replaced by a second screen 202.

In particular embodiments, in screen 202, there may be a upload queue 250 that displays the user-selected set of images to be uploaded, and a progress bar 220 that displays the current status of the upload process. For example, one specific image that is currently being uploaded may be visually distinguished from other images in upload queue 250. The user may navigate to and select any image 240 from upload queue 250, and provide metadata for that image 240 via an input component 230. In particular embodiments, the metadata may be in free-form text. In other implementations, the metadata may be tags or pointers to other files or records to other information stored on the client device, such as pointers to address book contacts, calendar event entries and the like. In one implementation, the tagging interface may provide a type-ahead field that suggest entries from a local database on the client device (e.g., contacts, calendar, etc.) based on the text string currently entered by the user.

User interface 200 enables the user to provide metadata for images 240 without exiting the upload application and while images 240 are being uploaded.

Figure 3:
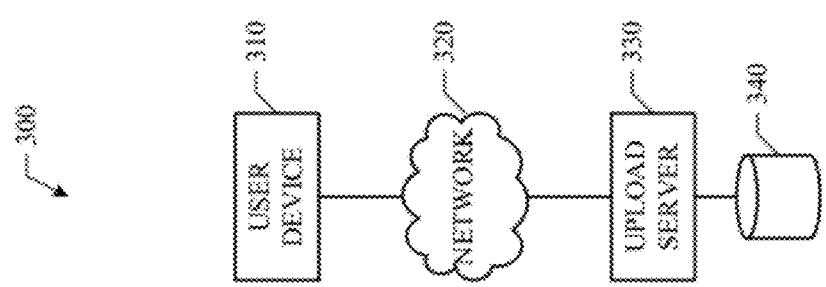
FIG. 3 illustrates an example system for concurrently uploading images and associating metadata with at least some of the images being uploaded.

FIG. 3 illustrates an example system 300 for concurrently uploading images and associating metadata with at least some of the images being uploaded. In particular embodiments, there may be images and other data stored on a user device 310. For example, user device 310 may be a desktop computer or a mobile device (e.g., mobile computer or telephone). In particular embodiments, user device 310 may include a digital camera and various types of sensors (e.g., GPS sensor). A user may take digital photographs with user device 310 and then upload the photographs to a upload server 330. User device 310 may establish a wired or wireless network or communication connection with upload server 330 via a network 320. In particular embodiments, while uploading the image data from user device 310 to upload server 330, the bandwidth of the network connection between user device 310 and upload server 330 may be substantially consumed by the uploading process (i.e., the uploading of the image data uses up most of the available bandwidth of the network connection). In particular embodiments, upload server 330 may be associated with a datastore 340 for storing the images received from user device 310.

In particular embodiments, the user may be a member of a social-networking website, and may, from time to time, upload photographs to his account at the social-networking website in order to share them with other members of the website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. Upload server 330 may be associated with the social-networking website.

Figure 4:
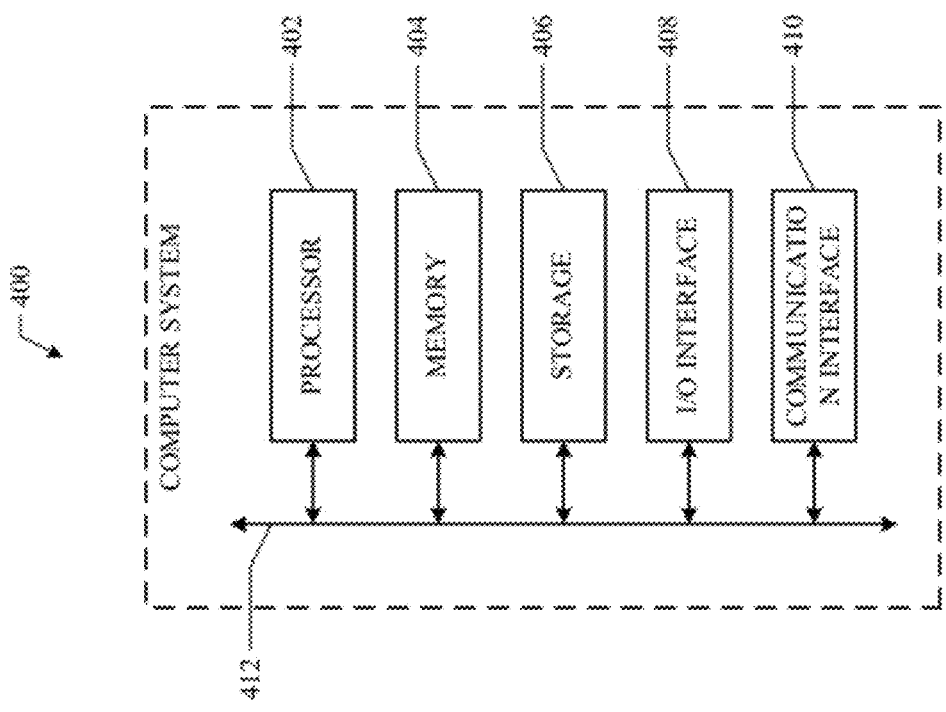
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    accessing, by a first computing device, a set of multimedia objects stored on the first computing device, wherein the set of multimedia objects is selected by a user of the first computing device;
    initiating, by the first computing device, upload of the set of multimedia objects to a second computing device;
    while the set of multimedia objects is being uploaded to the second computing device, concurrently receiving, by the first computing device, a selection by the user of a subset of the set of multimedia objects; and
    while the set of multimedia objects is being uploaded to the second computing device, concurrently receiving, by the first computing device, metadata being entered by the user, wherein the metadata corresponds to the selected subset of multimedia objects.

2. The method of claim 1, further comprising:
    after the set of multimedia objects is uploaded to the second computing device, uploading to the second computing device, by the first computing device, the metadata corresponding to the selected subset of multimedia objects.

3. The method of claim 1, further comprising:
    while the set of multimedia objects is being uploaded to the second computing device, automatically determining, by the first computing device, at least a portion of the metadata associated with one or more of the multimedia objects based at least in part on data stored on the first computing device.

4. The method of claim 1, further comprising:
    while the set of multimedia objects is being uploaded to the second computing device, providing, by the first computing device, a user interface for receiving, from the user, at least a portion of the metadata associated with one or more of the multimedia objects.

5. The method of claim 1, further comprising:
    establishing a connection, by the first computing device, with the second computing device for uploading the set of multimedia objects.

6. The method of claim 5, wherein while the set of multimedia objects is being uploaded to the second computing device, a bandwidth of the connection is consumed by the uploading of the set of multimedia objects.

7. The method of claim 1, wherein the first computing device is a mobile device.

8. The method of claim 1, wherein the set of multimedia objects is a set of digital images.

9. A first system comprising:
    one or more processors; and
    a memory coupled to the processors comprising instructions executable by the processors, the processors operable when executing the instructions to:
        access a set of multimedia objects stored on the first system, wherein the set of multimedia objects is selected by a user of the first system;
        initiate upload of the set of multimedia objects to a second system;
        while the set of multimedia objects is being uploaded to the second computing device, displaying the set of multimedia objects in a graphical user-interface to the user;
        while the set of multimedia objects is being uploaded to the second system, concurrently receive a selection by the user of a subset of the set of multimedia objects; and
        while the set of multimedia objects is being uploaded to the second system, concurrently receive metadata being entered by the user, wherein the metadata corresponds to the selected subset of multimedia objects.

10. The first system of claim 9, wherein the processors are further operable when executing the instructions to:
    after the set of multimedia objects is uploaded to the second system, upload to the second system the metadata associated with one or more of the multimedia objects.

11. The first system of claim 9, wherein the one or more processors are further operable when executing the instructions to:
    while the set of multimedia objects is being uploaded to the second system, automatically determine at least a portion of the metadata corresponding to the selected subset of multimedia objects based at least in part on data stored on the first system.

12. The first system of claim 9, wherein the one or more processors are further operable when executing the instructions to:
    while the set of multimedia objects is being uploaded to the second system, provide a user interface for receiving, from the user, at least a portion of the metadata corresponding to the selected subset of multimedia objects.

13. The first system of claim 9, wherein the one or more processors are further operable when executing the instructions to:
    establish a connection with the second system for uploading the set of multimedia objects, wherein while the set of multimedia objects is being uploaded to the second system, a bandwidth of the connection is consumed by the uploading of the set of multimedia objects.

14. The first system of claim 9, wherein the first system is a mobile device.

15. The first system of claim 9, wherein the set of multimedia objects is a set of digital images.

16. One or more computer-readable non-transitory storage media embodying software that is operable when executed by one or more processors associated with a first system to:
    access a set of multimedia objects stored on the first system, wherein the set of multimedia objects is selected by a user of the first system;
    initiate upload of the set of multimedia objects to a second system;
    while the set of multimedia objects is uploaded to the second computing device, displaying the set of multimedia objects in a graphical user-interface to the user;
    while the set of multimedia objects is being uploaded to the second system, concurrently receive a selection by the user of a subset of the set of multimedia objects; and
    while the set of multimedia objects is being uploaded to the second system, concurrently receive metadata being entered by the user, wherein the metadata corresponds to the selected subset of multimedia objects.

17. The media of claim 16, wherein the software is further operable when executed by the processors associated with the first system to:
    after the set of multimedia objects is uploaded to the second system, upload the metadata corresponding to the selected subset of multimedia objects.

18. The media of claim 16, wherein the software is further operable when executed by the processors associated with the first system to:
    while the set of multimedia objects is being uploaded to the second system, automatically determine at least a portion of the metadata corresponding to the selected subset of multimedia objects based at least in part on data stored on the first system.

19. The media of claim 16, wherein the software is further operable when executed by processors associated with the first system to:
    while the set of multimedia objects is being uploaded to the second system, provide a user interface for receiving, from the user, at least a portion of the metadata associated with one or more of the multimedia objects.

20. The media of claim 16, wherein the software is further operable when executed by processors associated with the first system to:
    establish a connection with the second system for uploading the set of multimedia objects, wherein while the set of multimedia objects is being uploaded to the second system, a bandwidth of the connection is consumed by the uploading of the set of multimedia objects.

21. The media of claim 16, wherein the first system is a mobile device.

22. The media of Claim 16, wherein the set of multimedia objects is a set of digital images.

* * * * *